(12) United States Patent
Farjadrad et al.

(10) Patent No.: US 12,204,482 B1
(45) Date of Patent: *Jan. 21, 2025

(54) MEMORY CHIPLET WITH EFFICIENT MAPPING OF MEMORY-CENTRIC INTERFACE TO DIE-TO-DIE (D2D) UNIT INTERFACE MODULES

(71) Applicant: Eliyan Corporation, Santa Clara, CA (US)

(72) Inventors: Ramin Farjadrad, Los Altos, CA (US); Kevin Donnelly, Santa Cruz, CA (US)

(73) Assignee: Eliyan Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,690

(22) Filed: May 1, 2024

Related U.S. Application Data

(60) Provisional application No. 63/543,108, filed on Oct. 9, 2023.

(51) Int. Cl.
*G06F 13/40* (2006.01)
*G06F 13/38* (2006.01)
*G06F 13/42* (2006.01)

(52) U.S. Cl.
CPC ........ *G06F 13/4068* (2013.01); *G06F 13/382* (2013.01); *G06F 13/4221* (2013.01);
(Continued)

(58) Field of Classification Search
CPC ............... G06F 13/4068; G06F 13/382; G06F 13/4221; G06F 2213/40; G06F 2213/16; G06F 2213/0026
See application file for complete search history.

(56) References Cited

U.S. PATENT DOCUMENTS

| | | |
|---|---|---|
| 4,334,305 A | 6/1982 | Girardi |
| 5,396,581 A | 3/1995 | Mashiko |

(Continued)

OTHER PUBLICATIONS

Block Memory Generator v8.2 LogiCORE IP Product Guide Vivado Design Suite; Xilinx; Apr. 1, 2015.
(Continued)

*Primary Examiner* — Henry Tsai
*Assistant Examiner* — Christopher A Daley
(74) *Attorney, Agent, or Firm* — Lance Kreisman; Peninsula Patent Group

(57) ABSTRACT

Semiconductor devices, packaging architectures and associated methods are disclosed. In one embodiment, a memory chiplet is disclosed. The memory chiplet includes a D2D interface of a first type for coupling to a host IC chip via multiple lanes. The D2D interface includes multiple unit interface modules, each of the multiple unit interface modules corresponding to a first set of signal path resources of a lowest granularity provided by the multiple lanes. A memory port includes a memory physical interface of a first memory type for accessing memory storage of the first memory type. The memory physical interface of the first memory type includes a second set of signal path resources corresponding to multiple memory channels of the first memory type. Mapping circuitry maps the second set of signal path resources to the first set of signal path resources in a manner that utilizes all of the first signal path resources for an integer number of the multiple unit interface modules.

20 Claims, 8 Drawing Sheets

(52) U.S. Cl.
CPC .. *G06F 2213/0026* (2013.01); *G06F 2213/16* (2013.01); *G06F 2213/40* (2013.01)

(56) References Cited

U.S. PATENT DOCUMENTS

| | | | |
|---|---|---|---|
| 5,677,569 | A | 10/1997 | Choi |
| 5,892,287 | A | 4/1999 | Hoffman |
| 5,910,010 | A | 6/1999 | Nishizawa |
| 6,031,729 | A | 2/2000 | Berkely |
| 6,055,235 | A | 4/2000 | Blanc |
| 6,417,737 | B1 | 7/2002 | Moloudi |
| 6,492,727 | B2 | 12/2002 | Nishizawa |
| 6,690,742 | B2 | 2/2004 | Chan |
| 6,721,313 | B1 | 4/2004 | Van Duyne |
| 6,932,618 | B1 | 8/2005 | Nelson |
| 7,027,529 | B1 | 4/2006 | Ohishi |
| 7,248,890 | B1 | 7/2007 | Raghavan |
| 7,269,212 | B1 | 9/2007 | Chau |
| 7,477,615 | B2 | 1/2009 | Oshita |
| 7,535,958 | B2 | 5/2009 | Best |
| 7,593,271 | B2 | 9/2009 | Ong |
| 7,701,957 | B1 | 4/2010 | Bicknell |
| 7,907,469 | B2 | 3/2011 | Sohn et al. |
| 7,978,754 | B2 | 7/2011 | Yeung |
| 8,004,330 | B1 | 8/2011 | Acimovic |
| 8,024,142 | B1 | 9/2011 | Gagnon |
| 8,121,541 | B2 | 2/2012 | Rofougaran |
| 8,176,238 | B2 | 5/2012 | Yu et al. |
| 8,468,381 | B2 | 6/2013 | Jones |
| 8,483,579 | B2 | 7/2013 | Fukuda |
| 8,546,955 | B1 | 10/2013 | Wu |
| 8,704,364 | B2 | 4/2014 | Banijamali et al. |
| 8,861,573 | B2 | 10/2014 | Chu |
| 8,948,203 | B1 | 2/2015 | Nolan |
| 8,982,905 | B2 | 3/2015 | Kamble |
| 9,088,334 | B2 | 7/2015 | Chakraborty |
| 9,106,229 | B1 | 8/2015 | Hutton |
| 9,129,935 | B1 | 9/2015 | Chandrasekar |
| 9,294,313 | B2 | 3/2016 | Prokop |
| 9,349,707 | B1 | 5/2016 | Sun |
| 9,379,878 | B1 | 6/2016 | Lugthart |
| 9,432,298 | B1 | 8/2016 | Smith |
| 9,558,143 | B2 | 1/2017 | Leidel |
| 9,832,006 | B1 | 11/2017 | Bandi |
| 9,842,784 | B2 | 12/2017 | Nasrullah |
| 9,886,275 | B1 | 2/2018 | Carlson |
| 9,934,842 | B2 | 4/2018 | Mozak |
| 9,961,812 | B2 | 5/2018 | Suorsa |
| 9,977,731 | B2 | 5/2018 | Pyeon |
| 10,171,115 | B1 | 1/2019 | Shirinfar |
| 10,394,737 | B1 | 8/2019 | Ngo |
| 10,402,363 | B2 | 9/2019 | Long et al. |
| 10,410,694 | B1 | 9/2019 | Arbel |
| 10,439,661 | B1 | 10/2019 | Heydari |
| 10,642,767 | B1 | 5/2020 | Farjadrad |
| 10,678,738 | B2 | 6/2020 | Dai |
| 10,735,176 | B1 | 8/2020 | Heydari |
| 10,748,852 | B1 | 8/2020 | Sauter |
| 10,803,548 | B2 | 10/2020 | Matam et al. |
| 10,804,204 | B2 | 10/2020 | Rubin et al. |
| 10,825,496 | B2 | 11/2020 | Murphy |
| 10,855,498 | B1 | 12/2020 | Farjadrad |
| 10,935,593 | B2 | 3/2021 | Goyal |
| 11,088,876 | B1 | 8/2021 | Farjadrad |
| 11,100,028 | B1 | 8/2021 | Subramaniam |
| 11,164,817 | B2 | 11/2021 | Rubin et al. |
| 11,204,863 | B2 | 12/2021 | Sheffler |
| 11,581,282 | B2 | 2/2023 | Elshirbini |
| 11,669,474 | B1 | 6/2023 | Lee |
| 11,782,865 | B1* | 10/2023 | Kochavi ............. G06F 13/4221 710/306 |
| 11,789,649 | B2 | 10/2023 | Chatterjee et al. |
| 11,841,815 | B1 | 12/2023 | Farjadrad |
| 11,842,986 | B1 | 12/2023 | Ramin |
| 11,855,043 | B1 | 12/2023 | Farjadrad |
| 11,855,056 | B1 | 12/2023 | Rad |
| 11,892,242 | B2 | 2/2024 | Mao |
| 11,893,242 | B1* | 2/2024 | Farjadrad ............... H01L 25/16 |
| 11,983,125 | B2 | 5/2024 | Soni |
| 12,001,355 | B1 | 6/2024 | Dreier |
| 2002/0122479 | A1 | 9/2002 | Agazzi |
| 2002/0136315 | A1 | 9/2002 | Chan |
| 2004/0088444 | A1 | 5/2004 | Baumer |
| 2004/0113239 | A1 | 6/2004 | Prokofiev |
| 2004/0130347 | A1 | 7/2004 | Moll |
| 2004/0156461 | A1 | 8/2004 | Agazzi |
| 2005/0041683 | A1 | 2/2005 | Kizer |
| 2005/0134306 | A1 | 6/2005 | Stojanovic |
| 2005/0157781 | A1 | 7/2005 | Ho |
| 2005/0205983 | A1 | 9/2005 | Origasa |
| 2006/0060376 | A1 | 3/2006 | Yoon |
| 2006/0103011 | A1 | 5/2006 | Andry |
| 2006/0158229 | A1 | 7/2006 | Hsu |
| 2006/0181283 | A1 | 8/2006 | Wajcer |
| 2006/0188043 | A1 | 8/2006 | Zerbe |
| 2006/0250985 | A1 | 11/2006 | Baumer |
| 2006/0251194 | A1 | 11/2006 | Bublil |
| 2007/0281643 | A1 | 12/2007 | Kawai |
| 2008/0063395 | A1 | 3/2008 | Royle |
| 2008/0143422 | A1 | 6/2008 | Lalithambika |
| 2008/0186987 | A1 | 8/2008 | Baumer |
| 2008/0222407 | A1 | 9/2008 | Carpenter |
| 2009/0113158 | A1 | 4/2009 | Schnell |
| 2009/0154365 | A1 | 6/2009 | Diab |
| 2009/0174448 | A1 | 7/2009 | Zabinski |
| 2009/0220240 | A1 | 9/2009 | Abhari |
| 2009/0225900 | A1 | 9/2009 | Yamaguchi |
| 2009/0304054 | A1 | 12/2009 | Tonietto |
| 2010/0177841 | A1 | 7/2010 | Yoon |
| 2010/0197231 | A1 | 8/2010 | Kenington |
| 2010/0294547 | A1 | 11/2010 | Hatanaka |
| 2011/0029803 | A1 | 2/2011 | Redman-White |
| 2011/0038286 | A1 | 2/2011 | Ta |
| 2011/0167297 | A1 | 7/2011 | Su |
| 2011/0187430 | A1 | 8/2011 | Tang |
| 2011/0204428 | A1 | 8/2011 | Erickson |
| 2011/0267073 | A1 | 11/2011 | Chengson |
| 2011/0293041 | A1 | 12/2011 | Luo |
| 2012/0082194 | A1 | 4/2012 | Tam |
| 2012/0182776 | A1 | 7/2012 | Best |
| 2012/0192023 | A1 | 7/2012 | Lee |
| 2012/0216084 | A1 | 8/2012 | Chun |
| 2012/0327818 | A1 | 12/2012 | Takatori |
| 2013/0181257 | A1 | 7/2013 | Ngai |
| 2013/0222026 | A1 | 8/2013 | Havens |
| 2013/0249290 | A1 | 9/2013 | Buonpane |
| 2013/0285584 | A1 | 10/2013 | Kim |
| 2014/0016524 | A1 | 1/2014 | Choi |
| 2014/0048947 | A1 | 2/2014 | Lee |
| 2014/0126613 | A1 | 5/2014 | Zhang |
| 2014/0192583 | A1 | 7/2014 | Rajan |
| 2014/0269860 | A1 | 9/2014 | Brown |
| 2014/0269983 | A1 | 9/2014 | Baeckler |
| 2015/0012677 | A1 | 1/2015 | Nagarajan |
| 2015/0172040 | A1 | 6/2015 | Pelekhaty |
| 2015/0180760 | A1 | 6/2015 | Rickard |
| 2015/0206867 | A1 | 7/2015 | Lim |
| 2015/0271074 | A1 | 9/2015 | Hirth |
| 2015/0326348 | A1 | 11/2015 | Shen |
| 2015/0358005 | A1 | 12/2015 | Chen |
| 2016/0056125 | A1 | 2/2016 | Pan |
| 2016/0071818 | A1 | 3/2016 | Wang |
| 2016/0111406 | A1 | 4/2016 | Mak |
| 2016/0217872 | A1 | 7/2016 | Hossain |
| 2016/0294585 | A1 | 10/2016 | Rahman |
| 2017/0317859 | A1 | 11/2017 | Hormati |
| 2017/0331651 | A1 | 11/2017 | Suzuki |
| 2018/0010329 | A1 | 1/2018 | Golding, Jr. |
| 2018/0082981 | A1 | 3/2018 | Gowda |
| 2018/0137005 | A1 | 5/2018 | Wu |
| 2018/0175001 | A1 | 6/2018 | Pyo |
| 2018/0190635 | A1 | 7/2018 | Choi |
| 2018/0196767 | A1* | 7/2018 | Linstadt ............. G06F 13/1694 |
| 2018/0210830 | A1 | 7/2018 | Malladi et al. |

(56) References Cited

U.S. PATENT DOCUMENTS

| | | |
|---|---|---|
| 2018/0315735 A1 | 11/2018 | Delacruz |
| 2019/0044764 A1 | 2/2019 | Hollis |
| 2019/0058457 A1 | 2/2019 | Ran |
| 2019/0108111 A1 | 4/2019 | Levin |
| 2019/0198489 A1 | 6/2019 | Kim |
| 2019/0319626 A1 | 10/2019 | Dabral |
| 2020/0051961 A1 | 2/2020 | Rickard |
| 2020/0105718 A1 | 4/2020 | Collins et al. |
| 2020/0257619 A1 | 8/2020 | Sheffler |
| 2020/0364142 A1* | 11/2020 | Lin .................. G06F 12/0615 |
| 2020/0373286 A1 | 11/2020 | Dennis |
| 2021/0056058 A1 | 2/2021 | Lee |
| 2021/0082875 A1 | 3/2021 | Nelson |
| 2021/0117102 A1 | 4/2021 | Grenier |
| 2021/0181974 A1 | 6/2021 | Ghosh |
| 2021/0183842 A1 | 6/2021 | Fay |
| 2021/0193567 A1 | 6/2021 | Cheah et al. |
| 2021/0225827 A1 | 7/2021 | Lanka |
| 2021/0258078 A1 | 8/2021 | Meade |
| 2021/0311900 A1 | 10/2021 | Malladi |
| 2021/0365203 A1 | 11/2021 | O |
| 2021/0405919 A1* | 12/2021 | K ....................... G06F 3/0671 |
| 2022/0051989 A1 | 2/2022 | Agarwal |
| 2022/0121381 A1 | 4/2022 | Brewer |
| 2022/0159860 A1 | 5/2022 | Winzer |
| 2022/0179792 A1 | 6/2022 | Banerjee |
| 2022/0222198 A1 | 7/2022 | Lanka |
| 2022/0223522 A1 | 7/2022 | Scearce |
| 2022/0237138 A1 | 7/2022 | Lanka |
| 2022/0254390 A1 | 8/2022 | Gans |
| 2022/0327276 A1 | 10/2022 | Seshan |
| 2022/0334995 A1 | 10/2022 | Das Sharma |
| 2022/0342840 A1 | 10/2022 | Das Sharma |
| 2022/0350756 A1* | 11/2022 | Burstein ............ G06F 13/1668 |
| 2022/0391114 A1* | 12/2022 | Richter ................ G06F 3/0632 |
| 2023/0039033 A1 | 2/2023 | Zarkovsky |
| 2023/0068802 A1 | 3/2023 | Wang |
| 2023/0090061 A1 | 3/2023 | Zarkovsky |
| 2023/0181599 A1 | 5/2023 | Erickson |
| 2023/0359579 A1 | 11/2023 | Madhira |
| 2024/0007234 A1* | 1/2024 | Harrington ............ H04L 69/22 |
| 2024/0028208 A1* | 1/2024 | Kim .................... G06F 13/1684 |
| 2024/0241840 A1* | 7/2024 | Im ....................... G06F 13/4068 |
| 2024/0273041 A1 | 8/2024 | Lee |

OTHER PUBLICATIONS

Farjadrad et al., "A Bunch of Wires (BOW) Interface for Inter-Chiplet Communication", 2019 IEEE Symposium on High-Performance Interconnects (HOTI), pp. 27-30, Oct. 2019.

Universal Chiplet Interconnect Express (UCIe) Specification Rev. 1.0, Feb. 24, 2022.

Kurt Lender et al., "Questions from the Compute Express Link Exploring Coherent Memory and Innovative Cases Webinar", Apr. 13, 2020, CXL Consortium, pp. 1-6.

Planet Analog, "The basics of SerDes (serializers/deserializers) for interfacing", Dec. 1, 2020, Planet Analog, as preserved by the internet Archive, pp. 1-9.

"Hot Chips 2017: Intel Deep Dives Into EMIB", TomsHardware.com; Aug. 25, 2017.

"Using Chiplet Encapsulation Technology to Achieve Processing-In-Memory Functions"; Micromachines 2022, 13, 1790; https://www.mdpi.com/journal/micromachines; Tian et al.

"Multiport memory for high-speed interprocessor communication in MultiCom;" Scientia Iranica, vol. 8, No. 4, pp. 322-331; Sharif University of Technology, Oct. 2001; Asgari et al.

Universal Chiplet Interconnect Express (UCIe) Specification, Revision 1.1, Version 1.0, Jul. 10, 2023.

Hybrid Memory Cube Specification 2.1, Hybrid Memory Cube Consortium, HMC-30G-VSR PHY, 2014.

"Using Dual Port Memory as Interconnect", EE Times, Apr. 26, 2005, Daniel Barry.

Quartus II Handbook Version 9.0 vol. 4: SOPC Builder; "System Interconnect Fabric for Memory-Mapped Interfaces"; Mar. 2009.

* cited by examiner

FIG. 4

HBM SIGNALS 400

| Function | Input/Output | HBM3/4 Pins |
|---|---|---|
| Data Read & Write (bidi) | InOut | 64 |
| ECC + DPAR (2+1 per sub channel) | InOut | 6 |
| Column C/A | Input | 8 |
| Row C/A | Input | 10 |
| APAR^ | Input | 1 |
| DBI | InOut | 8 |
| SEV | Output | 4 |
| DERR | Output | 2 |
| AERR^ | Output | 1 |
| Clock | Input | 2 |
| Strobe | InOut | 8 |
| Redundant Data | InOut | 4 |
| Redundant Address | Input | 1 |
| RPU | Input | 1 |
| Total | | 120 |

404, 406, 408, 410, 402

UCIe SIGNALS 412

| Function | Input/Output | UCIe HBM3/4 Pins | UCIe speed | |
|---|---|---|---|---|
| Data Read (uni) | Output | 32 | 16 | uni |
| ECC + DPAR Read (2+1 per sub channel) | Output | 3 | 16 | uni |
| Data Write (uni) | Input | 32 | 16 | uni |
| ECC + DPAR Write (2+1 per sub channel) | Input | 3 | 16 | uni |
| Column C/A | Input | 2 | 16 | |
| Row C/A | Input | 3 | 16 | |
| APAR^ | Input | 0 | 16 | |
| DBI | InOut | N/A | | |
| SEV | Output | 2 | 16 | |
| DERR | Output | 1 | 16 | |
| AERR^ | Output | 1 | 16 | |
| Clocks | InOut | AP UCIe has 1 clk pair per 32/64 data lanes | | |
| Strobe | | N/A | | |
| Redundant Data Tx | Output | 2 | | uni |
| Redundant Data Rx | Input | 2 | | uni |
| Redundant C/A Rx/Tx | In+Out | 1 | | uni |
| Total | | 84 | | |

414

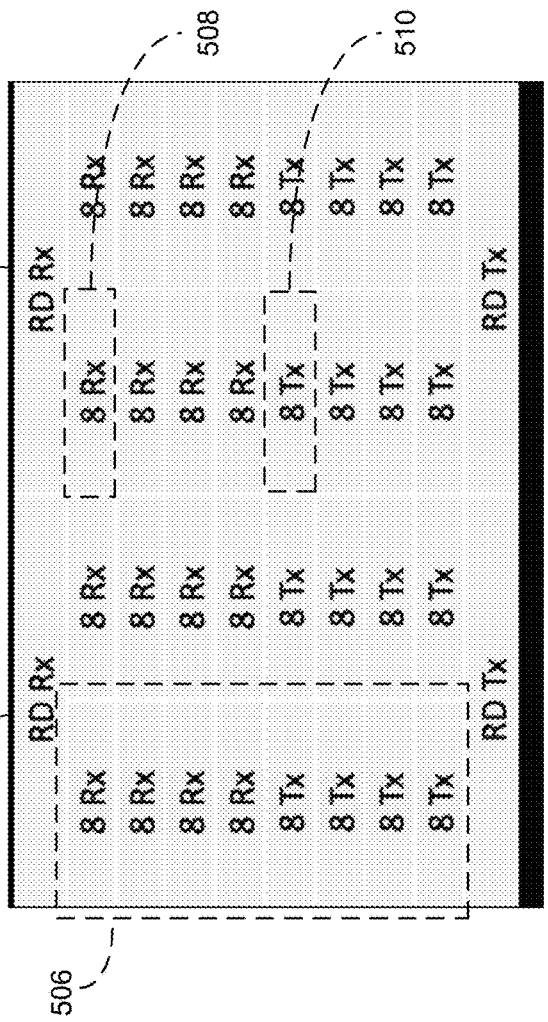

FIG. 7

HBM SIGNALS 700

| Function | Input Output | HBM3/4 pins |
|---|---|---|
| Data Read & Write (hbi) | InOut | 64 |
| ECC + DPAR (2+1 per sub channel) | InOut | 6 |
| Column C/A | Input | 8 |
| Row C/A | Input | 10 |
| APAR* | Input | 1 |
| DBI | InOut | 8 |
| SEV | Output | 4 |
| DERR | Output | 2 |
| AERR* | Output | 1 |
| Clock | Input | 2 |
| Track | Output | N/A |
| Redundant Data | InOut | 4 |
| Redundant Address | Input | 1 |
| RPU | Input | 1 |
| Total | | 120 |

UMI SIGNALS 704

| Function | Input Output | UCIe HBM3/4 pins | UCIe speed | |
|---|---|---|---|---|
| Data Read/Write (umi) | InOut | 32 | 16 | hbi |
| ECC + DPAR Read (2+1 per sub channel) | Output | 3 | 16 | umi |
| ECC + DPAR Write (2+1 per sub channel) | Input | 3 | 16 | umi |
| Column C/A | Input | 2 | 16 | |
| Row C/A | Input | 3 | 16 | |
| APAR* | Input | 0 | 16 | |
| DBI | InOut | N/A | | |
| SEV | Output | 2 | 16 | |
| DERR | Output | 1 | 16 | |
| AERR* | Output | 1 | 16 | |
| Clocks | A/P UCIe has 1 clk pair per 32/64 data lanes | | | |
| Redundant Data Tx | Output | 2 | when on | |
| Redundant Data Rx | Input | 2 | | umi |
| Redundant C/A Rx/Tx | In+Out | 1 | | umi |
| Total | | 52 | | |

706

MEMORY CHIPLET WITH EFFICIENT MAPPING OF MEMORY-CENTRIC INTERFACE TO DIE-TO-DIE (D2D) UNIT INTERFACE MODULES

CROSS-REFERENCE TO RELATED APPLICATIONS

This application is a Non-Provisional that claims priority to U.S. Provisional Application No. 63/534,108, filed Aug. 22, 2023, entitled NULINK-ENABLED HBM WITH ADVANCE-NODE BASE DIE, which is incorporated herein by reference in its entirety.

TECHNICAL FIELD

The disclosure herein relates to semiconductor devices, packaging and associated methods.

BACKGROUND

As integrated circuit (IC) chips such as system on chips (SoCs) become larger, the yields realized in manufacturing the chips become smaller. Decreasing yields for larger chips increases overall costs for chip manufacturers. To address the yield problem, chiplet architectures have been proposed that favor a modular approach to SoCs. The solution employs smaller sub-processing chips, each containing a well-defined subset of functionality. Chiplets thus allow for dividing a complex design, such as a high-end processor or networking chip, into several small die instead of one large monolithic die.

When accessing memory, traditional chiplet architectures often employ relatively large and complex die-to-die (D2D) interfaces for transferring data between the chiplet and a specific memory type. While beneficial in certain circumstances, many conventional D2D interfaces are typically designed to support a variety of applications. Using generic interfaces specifically for memory applications in a chiplet context is often non-optimal, with sacrifices in area and power efficiency often made in the interests of wider interface applicability.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 4 illustrates one embodiment of a mapping of signals between an HBM interface and a UCIe unidirectional D2D interface employed to support two high bandwidth memory (HBM) channels.

FIG. 5 illustrates how a single HBM channel maps over multiple UCIe unit interface modules.

FIG. 6 illustrates one embodiment of how eight HBM channels map to five fully-packed UCIe unit interface modules.

FIG. 7 illustrates one embodiment of a mapping of signals between an HBM interface and a UMI bidirectional D2D interface employed to support four high bandwidth memory (HBM) channels.

DETAILED DESCRIPTION

Semiconductor devices, packaging architectures and associated methods are disclosed. In one embodiment, a memory chiplet is disclosed. The memory chiplet includes a D2D interface of a first type for coupling to a host IC chip via multiple lanes. The D2D interface includes multiple unit interface modules, each of the multiple unit interface modules corresponding to a first set of signal path resources of a lowest granularity provided by the multiple lanes. A memory port includes a memory physical interface of a first memory type for accessing memory storage of the first memory type. The memory physical interface of the first memory type includes a second set of signal path resources corresponding to multiple memory channels of the first memory type. Mapping circuitry maps the second set of signal path resources to the first set of signal path resources in a manner that utilizes all of the signal path resources for an integer number of the multiple unit interface modules.

Throughout the disclosure provided herein, the term multi-chip module (MCM) is used to represent a semiconductor device that incorporates multiple semiconductor die or sub-packages in a single unitary package. An MCM may also be referred to as a system in a package (SiP). The die or sub-packages are referred to herein as chiplets. The die or sub-packages that are interconnected in an MCM or SiP are referred to herein as chiplets. Packaged die that are disposed external to an MCM or SiP, such as being mounted on a printed circuit board (PCB), are referred to herein as chips.

Figure 1:
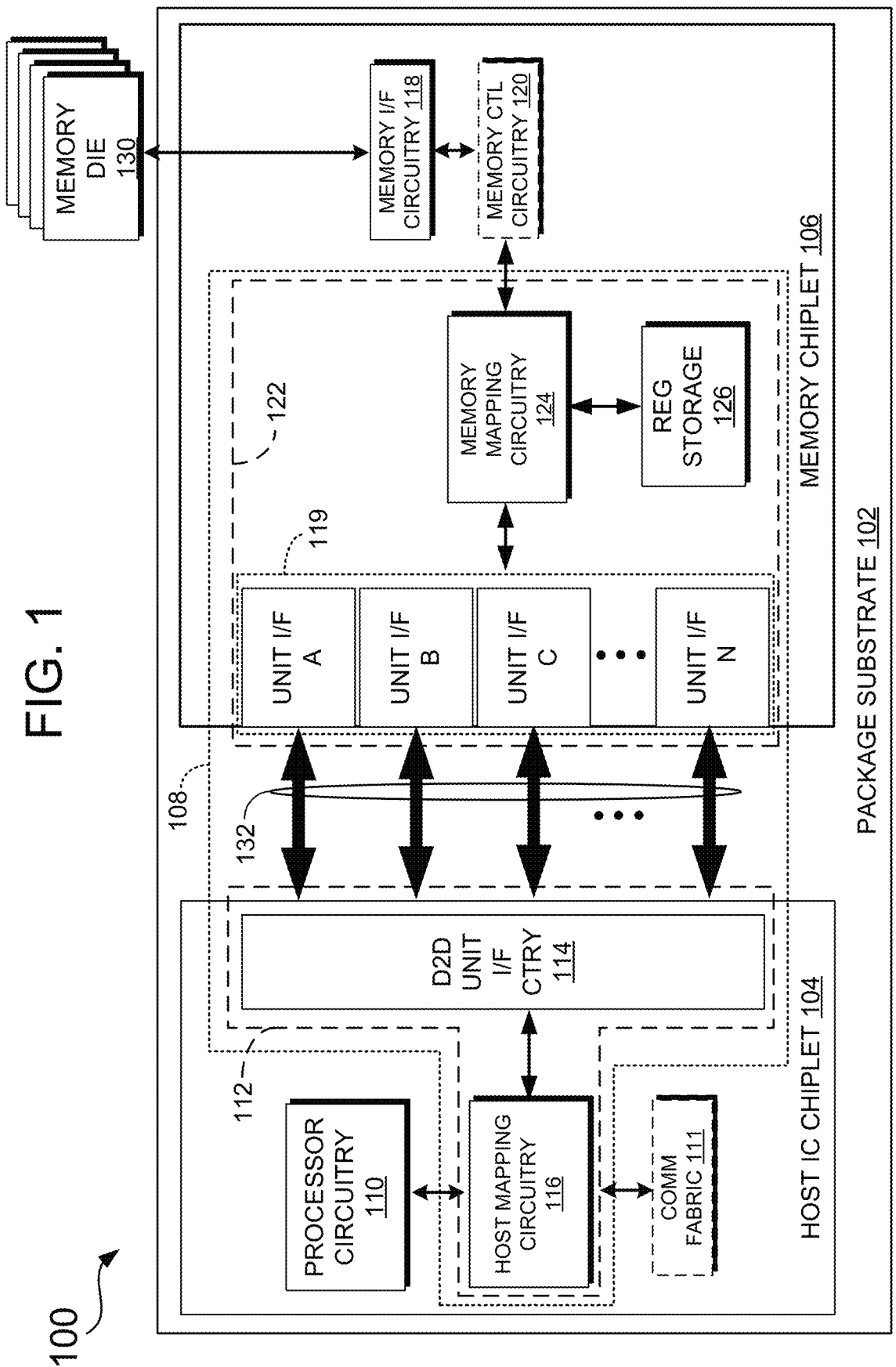
FIG. 1 illustrates a high-level top plan view of a multi-chip module (MCM), including a memory chiplet having a memory-centric interface signal matrix mapped to a die-to-die (D2D) interface that couples the memory chiplet to a host integrated circuit (IC) chiplet.

FIG. 1 illustrates one embodiment of an MCM, generally designated 100, that employs a package substrate 102 for mounting a host integrated circuit (IC) chiplet 104 and a memory chiplet 106. A die-to-die (D2D) interface circuit 108 provides a communications path and protocol between the host IC chiplet 104 and the memory chiplet 106. For one embodiment, the D2D interface circuit 108 takes the form of a Universal Chiplet Interface Express (UCIe) circuit that employs a UCIe physical (PHY) signaling lane architecture and a UCIe-specified signaling protocol, herein referred to as a UCIe die-to-die (D2D) interface. In another embodiment, the D2D interface circuit 108 may employ a physical interface similar to the UCIe standard, but operating in accordance with a universal memory interface (UMI)

packet-based protocol, herein referred to as a UMI die-to-die (D2D) interface. For some embodiments, use of the UCIe D2D interface or the UMI D2D interface as the interface circuit 108 may be selectable for corresponding UCIe or UMI modes of operation via the use of configurable mapping circuitry, described more fully below.

Further referring to FIG. 1, the package substrate 102 may take a variety of forms, depending on the application. For some embodiments, the package substrate 102 may be realized as a "standard" package substrate, formed with an organic non-silicon material and incorporating a relatively sparse trace density appropriate for standard ball grid array (BGA) contact arrays (such as on the order of approximately one hundred to one hundred fifty microns). In other embodiments, the package substrate 102 may take the form of an "advanced" package substrate.

Figure 2:
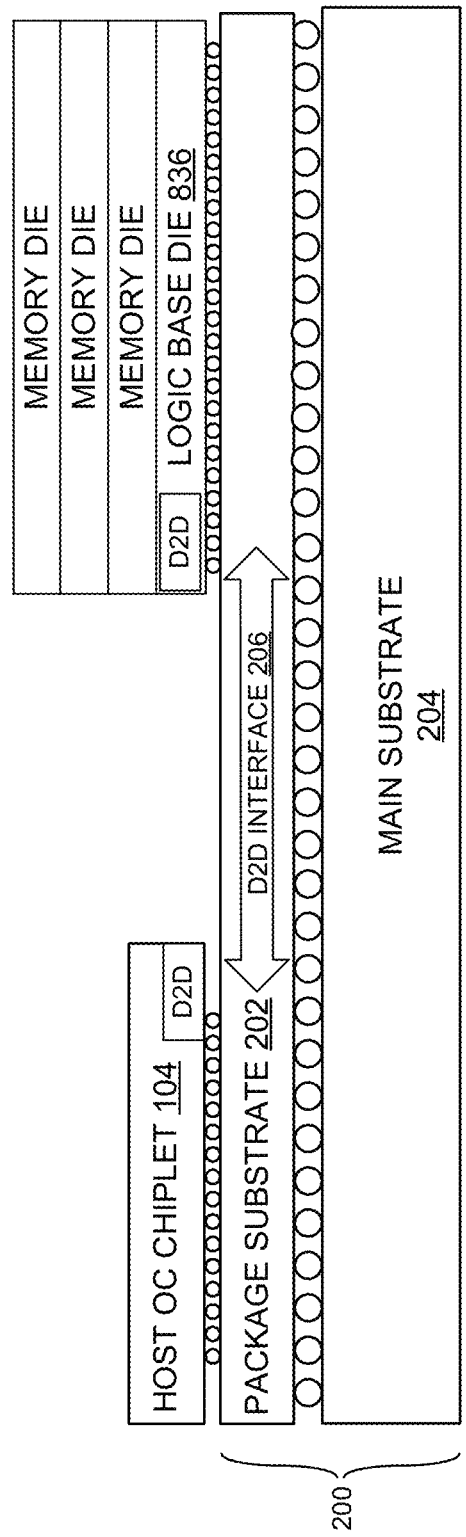
FIG. 2 illustrates a high-level side view of one embodiment of an advanced packaging architecture for the MCM of FIG. 1.

FIG. 2 illustrates one embodiment of the MCM 100 of FIG. 1 with an advanced package substrate 200. The advanced package substrate 200 includes a package substrate 202 that, for one embodiment, takes the form of a silicon interposer 202 disposed on a standard organic main substrate 204. The host IC chiplet 104 and the memory chiplet 106 are mounted on the silicon interposer 202. The silicon interposer 202 routes high-density signal paths, at 206, that couple the chiplets together. In some embodiments, the silicon interposer 202 may be substituted with a silicon bridge-based structure that may be embedded or mounted to the standard main substrate 204 that provides a trace density on the order of approximately twenty-five to fifty-five microns.

Referring back to FIG. 1, the host IC chiplet 104 generally includes processor circuitry 110 or other logic that performs operations on data, with the need to periodically carry out read and write data transfers with the memory chiplet 106. The processor circuitry 110 may take the form of one or more processors such as a computer processing unit (CPU), graphics processing unit (GPU), tensor processing unit (TPU), artificial intelligence (AI) processing circuitry, field-programmable gate array (FPGA) circuitry or other form of host chiplet with a need to access memory.

Further referring to FIG. 1, for situations where the UMI interface mode of operation is selected, the host IC chiplet 104 may include a communications fabric 111 for controlling communications on-chip, and for also controlling how the host IC chiplet 104 communicates off-chip with other chiplets, such as the memory chiplet 106. For one embodiment, the communications fabric 111 includes network-on-chip (NoC) circuitry, such as that disclosed in U.S. patent application Ser. No. 18/528,702, filed Dec. 4, 2023, titled: "UNIVERSAL NETWORK-ATTACHED MEMORY ARCHITECTURE", owned by the assignee of the instant application and expressly incorporated herein by reference.

With continued reference to FIG. 1, the host IC chiplet 104 includes a host interface sub-circuit 112 of the overall D2D interface circuit 108. Consistent with the various embodiments for the D2D interface circuit 108, the host interface sub-circuit 112 may take the form of a standardized UCIe D2D interface, or a UMI interface. Further detail for one embodiment of a UMI interface is described in copending U.S. patent application Ser. No. 18/652,675, filed May 1, 2024, titled "UNIVERSAL MEMORY INTERFACE", owned by the assignee of the instant application and expressly incorporated herein by reference.

Further referring to FIG. 1, the host interface sub-circuit 112 includes host input/output (I/O) circuitry 114 and host mapping circuitry 116. For embodiments utilizing a UCIe-based lane infrastructure, the host I/O circuitry 114 may be organized into unit interface modules, described more fully below with respect to the memory chiplet 106. The host mapping circuitry 116 generally maps an on-chip processor interface (not shown) of the processor circuitry 110 to the UCIe unit interface modules of the host I/O circuitry 114.

Further referring to FIG. 1, for one embodiment, the memory IC chiplet 106 includes a memory-centric interface 118 for accessing memory of a specific standard or type, such as high-bandwidth memory (HBM), double-data rate (DDR) memory, low-power double data rate (LPDDR), graphics double data rate (GDDR), to name but a few. For some embodiments, memory control circuitry 120 may be positioned on the memory chiplet 106 rather than the host IC chiplet 104. Positioning the memory control circuitry 120 on the memory chiplet 106 removes the need for the host IC chiplet 104 (often a costly application-specific integrated circuit) to know the type of memory being accessed, thereby allowing the host IC chiplet 104 the freedom to interact with a variety of memory types, and not constrained to one type of memory type associated with a specific on-chip memory controller.

For one embodiment, the memory chiplet 106 includes a second portion of the overall D2D interface 108, referred to herein as a memory interface sub-circuit 122. For one embodiment, the memory interface subcircuit 122 includes a D2D input/output (I/O) portion 119 that matches the host D2D unit interface circuitry 114, such as a standardized UCIe I/O configuration, or a UMI I/O configuration. A converter portion of the memory interface subcircuit 122 takes the form of mapping circuitry 124 that maps signals from the memory-centric interface circuitry 118 to the D2D I/O portion 119 of the memory interface subcircuit 122. Further details regarding various embodiments of the mapping circuitry 124 are set out below. To provide for user configurability, in some embodiments, register storage 126 may be provided on the memory chiplet 106 to store configurable parameters, such as one or more D2D interface modes for the memory chiplet 106, among other things.

For some embodiments, the memory chiplet 106 may take the form of a single-die chiplet that includes the memory control circuitry 120 and the features of the memory interface sub-circuit 122. The single-die chiplet may then be employed as a base die upon which are stacked memory die 130 for a stacked memory implementation, such as for HBM. Other embodiments may employ the single die as a buffer or intermediary between the IC chiplet 104 and memory die disposed proximate the single die on the package substrate 102 or off-MCM (not shown).

For one embodiment, the host interface subcircuit 112 of the host IC chiplet 104 connects to the memory interface subcircuit 122 of the memory chiplet 106 via multiple lanes 132. For a UCIe-based D2D interface embodiment, the multiple lanes 132 may be configured in accordance with a standardized UCIe unit interface or module architecture. A unit interface module generally corresponds to a lowest granularity of lanes to support a given interface width. One such example is an interface width of sixty-four data lanes, referred to as x64, which includes sixty-four data lanes along with supporting clock and control lanes.

Figure 3A:
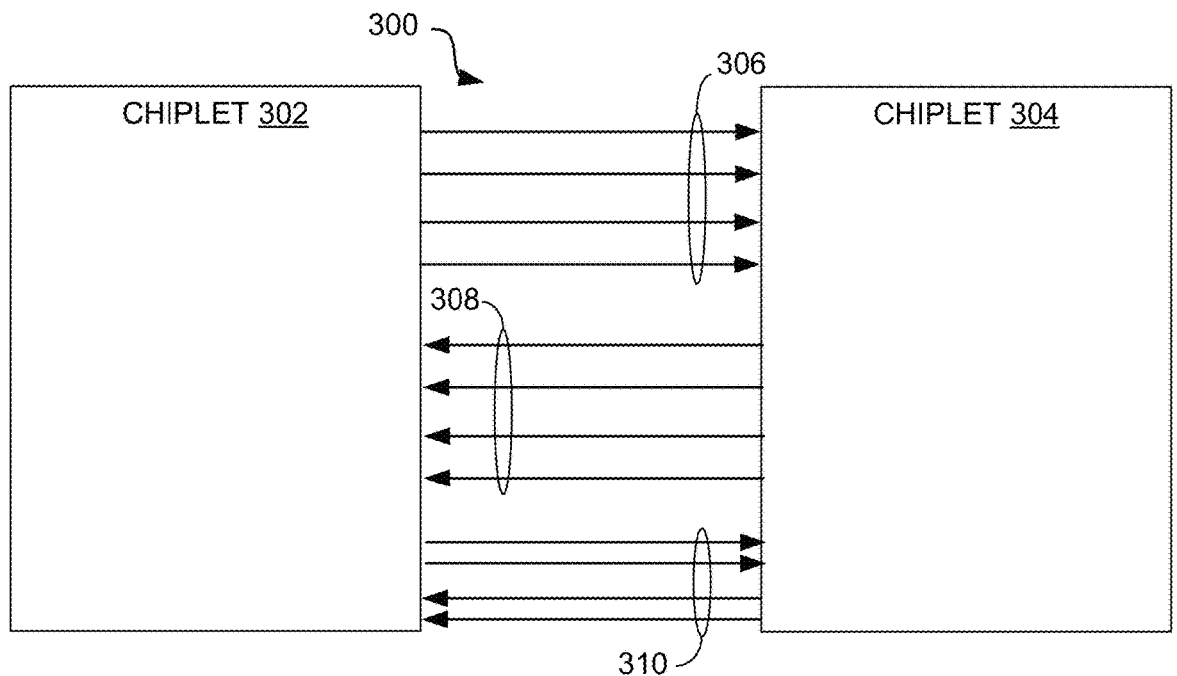
FIG. 3A illustrates a unit interface architecture for a UCIe die-to-die (D2D) interface for coupling the chiplets shown in FIG. 1.

FIG. 3A illustrates one embodiment of a UCIe unit interface, generally designated 300 disposed between chiplets 302 and 304. The UCIe unit interface includes a first fixed set of unidirectional data lanes 306 for transmitting data and associated clock and control lanes in a first direction, and a second set of unidirectional lanes 308 for receiving data in a second direction opposite the first direction, and a variety of control and clock lanes associated with the received data. Sideband links 310 may also be included in the UCIe unit interface architecture. For applications involving, for example, HBM memory, where as many as thirty-two or more memory channels may be employed, a plurality of UCIe unit interface modules 300 are employed, such as unit interface A (FIG. 1), unit interface B, and so on to the extent that all thirty-two channels are supported.

Figure 3B:
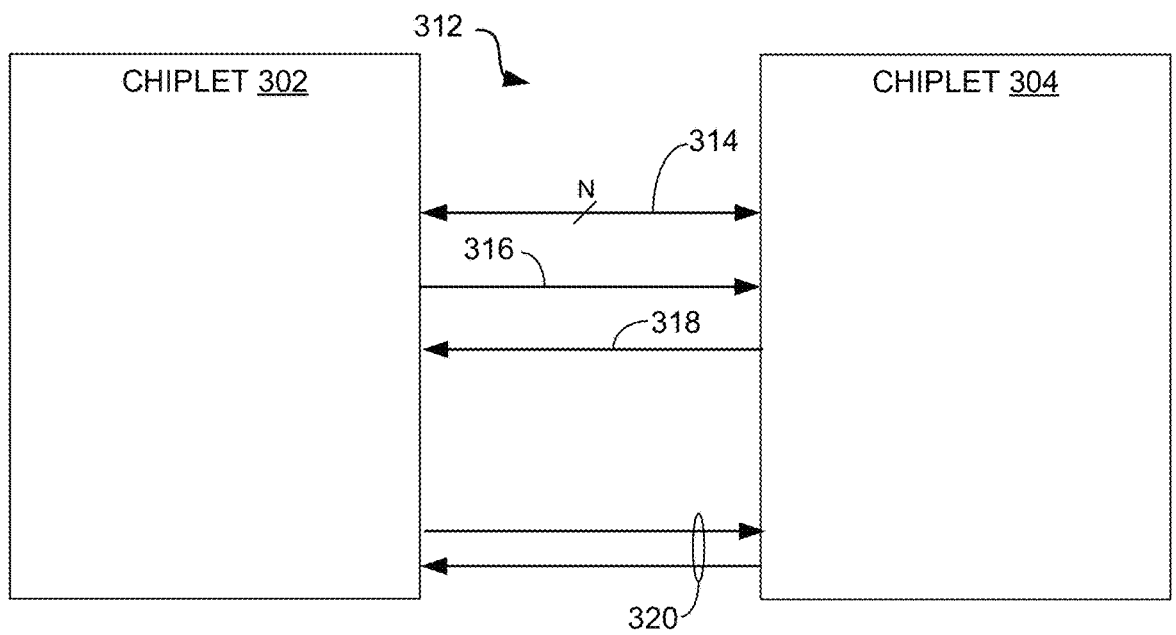
FIG. 3B illustrates a unit interface architecture for a UMI D2D interface for coupling the chiplets shown in FIG. 1.

FIG. 3B illustrates a UMI-based D2D unknit interface architecture 312, where the multiple lanes 132 (FIG. 1) may be configured in accordance with a dynamic bidirectional lane architecture such as that disclosed in copending U.S. patent application Ser. No. 18/652,707, filed May 1, 2024, titled "UNIVERSAL MEMORY INTERFACE WITH DYNAMIC BIDIRECTIONAL DATA TRANSFERS", owned by the assignee of the instant application and expressly incorporated herein by reference. For one embodiment, the UMI unit interface architecture 312 includes a set of N bidirectional data lanes 314, at least one egress lane 316, at least one ingress lane 318 and a sideband link 320. For one embodiment, described more fully below, UCIe modules may be reconfigured such that groups of opposing unidirectional lanes are used to mimic the operation of bidirectional lanes.

Generally, from the perspective of the host IC chiplet 104, one specific version of the UMI lane architecture partitions the set of bidirectional lanes 312 into a first sub-set of switchable bidirectional data lanes for transferring first data in a first selected direction, and a second sub-set of the bidirectional lanes for transferring second data in the same or opposite direction. The UMI interface is configured with memory transactions in mind to employ and utilize memory-centric features and functionality, thereby reducing latency and power consumption that might otherwise result from use of a generic D2D interface, such as UCIe, designed for a wide range of applications.

Use of the UCIe D2D interface 300 or the UMI D2D interface 312 to transfer signals between the chiplets 104 and 106 provides significant silicon area and power consumption benefits over previously proposed chiplet interconnect alternatives. In using either D2D interface architecture, signals traversing over the D2D interface signaling paths eventually must originate or end at the memory interface circuitry 118 on the memory chiplet 106. In an effort to more efficiently organize the D2D unit interface usage for minimum area and power usage, the memory mapping circuitry 124 maps the memory-centric signals between the memory interface circuitry 118 and the plurality of unit interface units or modules 119 to minimize the number of active modules, thus reducing power consumption and potentially the chiplet beachfront area.

FIG. 4 illustrates two tables of signals for mapping an HBM interface onto a x64 UCIe unit interface module that may be used for advanced packaging applications. At 400, a first table of signals, labeled HBM SIGNALS, identifies signal paths used by the memory-centric interface circuitry 118 that correspond to one HBM memory channel of an HBM memory device architecture. Operating at a data rate of up to 8 Gbps, and generally described above, the number of signals amounts to one-hundred-twenty, at 402, including data (64 signals), at 404, parity bits (6), at 406, address bits (18), at 408, and a variety of other control, clocking-related, and redundancy-related bits (32), at 410.

Further referring to FIG. 4, at 412, a second table of signals, labeled UCIe SIGNALS, identifies a mapping of the number of UCIe paths to support the single channel of HBM memory. For one embodiment, certain signal paths used in a memory-specific interface, such as column and row address paths, DBI, APAR and others, may be omitted, which allows for reducing the number of signaling paths from one-hundred twenty to eighty-four, at 414.

FIG. 5 illustrates a high-level organization of I/Os represented by two UCIe unit interface modules, at 502 and 504, each unit interface module representing the unit lane architecture of FIG. 3A. For one embodiment, a single bidirectional channel of HBM may be mapped to one-half of the first UCIe unit interface module 502, at 506, along with ⅛ of the second UCIe unit interface module 504, distributed at 508 and 510. For one embodiment, the HBM data lanes are mapped to the first module 502, with supporting address, control and other related signals (such as ECC, DERR, AERR, APAR) for the channel mapped as a remainder portion to the second module 504.

FIG. 6 illustrates how the module mapping of FIG. 5 scales to eight HBM channels, CH1 through CH8, which are mapped over five UCIe unit interface modules 512, 514, 516, 518 and 520. Since each HBM channel mapping involves a remainder portion of ⅛ of one module, for one embodiment, the middle module 516 includes the remainder portions from channels CH1-CH8 mapped to the four other modules 512, 514, 518 and 520. Mapping eight HBM channels to five UCIe unit interface modules enables a full complement of thirty-two HBM channels to be mapped to twenty UCIe unit interface modules. With advanced packaging contact bump pitch dimensions on the order of forty-five to fifty-five micrometers, minimizing the number of UCIe modules allows for all thirty-two channels to be accessible via a single chiplet edge. Additionally, fully packing the modules eliminates any unnecessary power consumption from underutilized partial modules.

Figure 8:
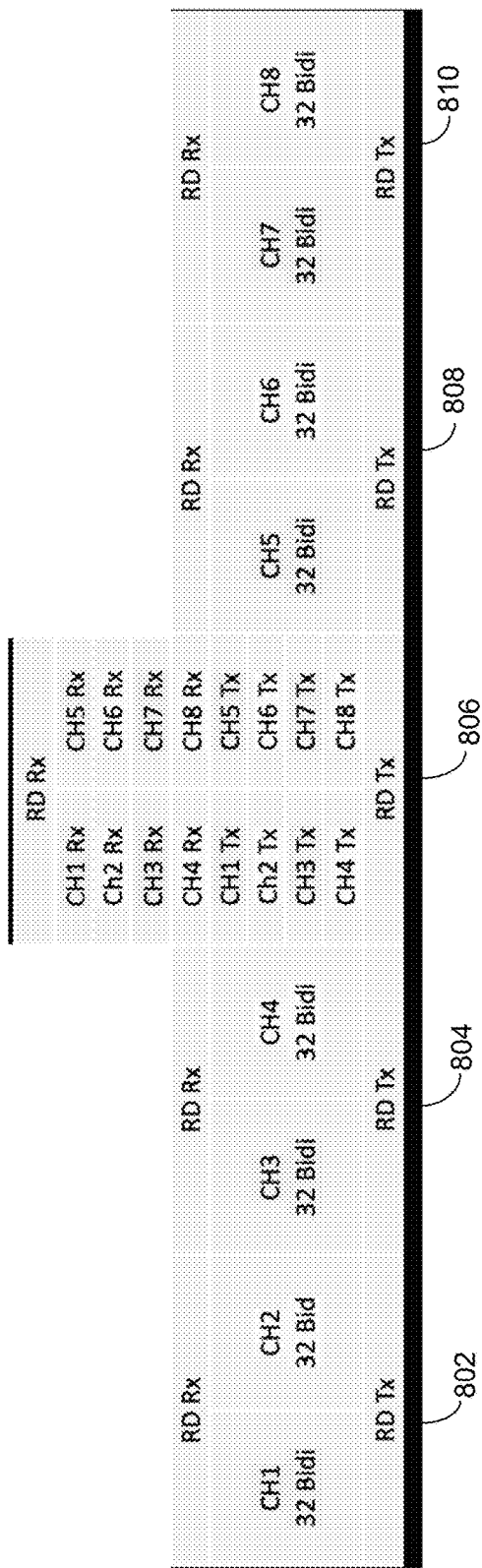
FIG. 8 illustrates an embodiment of a module mapping similar to FIG. 7, and showing how five partially-packed UCIe modules map to eight HBM channels using a bidirectional D2D lane architecture.

FIG. 7 illustrates two tables of signals for mapping HBM onto multiple UCIe unit interface modules, but repurposing the unidirectional UCIe lanes into bidirectional data lanes and the support lanes shown in FIG. 3B. This may be accomplished by configuring (with supporting I/O circuitry) the UCIe unidirectional lanes and associated contact bumps to mimic the functionality of bidirectional lanes and bumps. At 700, a first table of signals, labeled HBM SIGNALS, identifies the signal paths used by the memory-centric interface circuitry 118 that correspond to one HBM memory channel of an HBM memory device architecture. This table was previously presented in FIG. 4, but reproduced here for ease of comparison to the UMI signals, which are presented in the second table 704, labeled UMI SIGNALS. Of note is the significant reduction in signal count using the UMI unit interface, from eighty-four to fifty-two signals, shown at 706. A corresponding UCIe module mapping for eight HBM channels using the UMI unit architecture mapped onto UCIe is shown in FIG. 8. Like the earlier UCIe mapping, the UMI mapping may be spread out over five UCIe modules, at 802, 804, 806, 808, and 810, but with half the data lanes of each module, resulting in approximately half the area usage at the beachfront edge of the memory chiplet 106, where the electrical connections between the memory chiplet 106 and the package substrate 102 are made.

Figure 9:
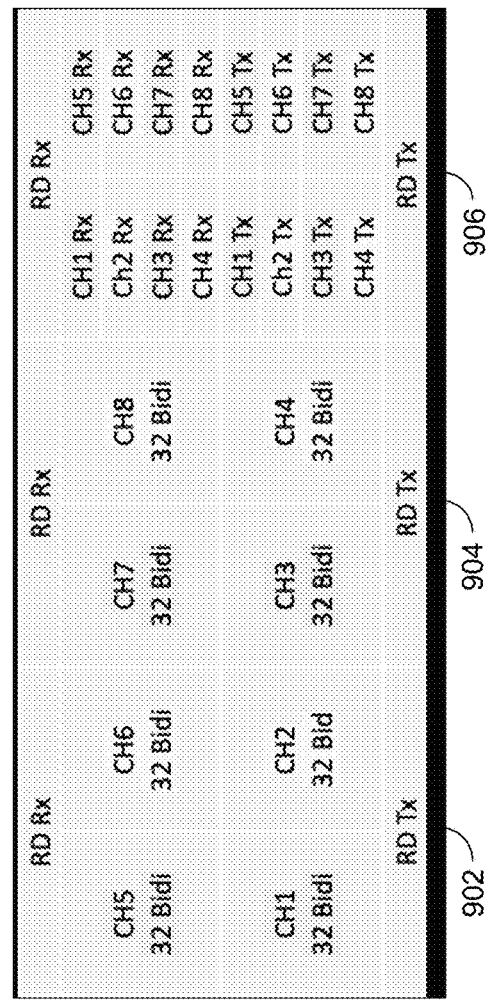
FIG. 9 illustrates an embodiment of a module mapping similar to FIG. 8, and showing how three fully-packed UCIe modules map to sixteen HBM channels.

For one embodiment, instead of mapping the eight HBM channels to five modules, three fully-packed modules may be mapped, reducing the number of active modules by forty percent. FIG. 9 illustrates one embodiment of such a mapping, with modules 902 and 904 mapped for data lanes, and module 906 mapped for partial module portions.

In some situations, mapping from the HBM interface to the UCIe PHY infrastructure using a UMI-based architecture may be avoided by providing a UMI PHY that is optimized for use in memory applications. In such an embodiment, involving mapping bidirectional HBM signals to bidirectional UMI lanes, further efficiencies in power and bandwidth are possible.

Figure 10:
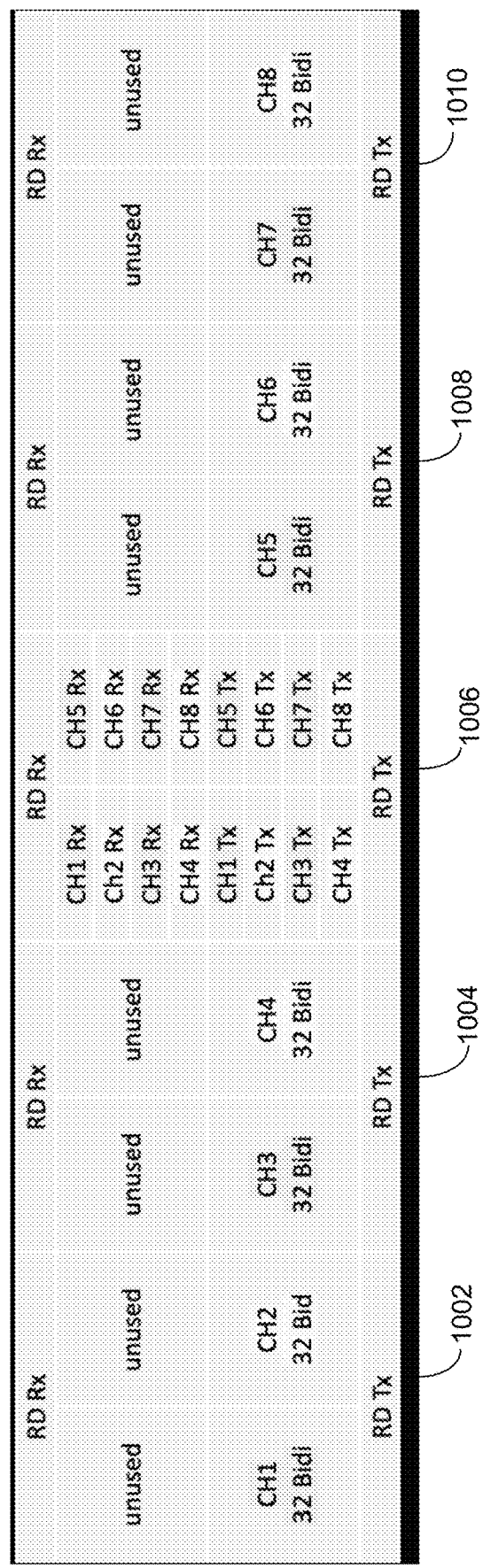
FIG. 10 illustrates one embodiment of a module mapping showing similar to FIGS. 7 through 9, illustrating five fully-mapped bump modules for a configurable conversion of eight HBM channels via a bidirectional lane-based D2D interface such as UMI or eight HBM channels via a unidirectional lane-based Universal Chiplet Interface Express (UCIe) D2D interface.

For one embodiment, the memory mapping circuitry 124 is configurable to allow for a selection between mappings for multiple D2D PHY architectures. FIG. 10 illustrates a potential module mapping that supports the use of both UCIe and UMI with the UCIe advanced package unit interface module structures. The entire resources of five modules 1002, 1004, 1006, 1008 and 1010 support a UCIe D2D configuration, while half the modules 1002, 1004, 1008, and 1010 are used to support the UMI data lane configuration. The middle module, at 1006, supports partial mappings for the four other modules in order to minimize the number of modules employed. Selections between one D2D configuration or another may be made, for example, through loading and storing a selectable value in the register circuitry 126 of the memory chiplet 106.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present disclosure. In some instances, the terminology and symbols may imply specific details that are not required to practice aspects of the disclosure. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While aspects of the disclosure herein have been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A chiplet-based multi-chip module (MCM) to couple to a base substrate, comprising:
   a package substrate that is separate from the base substrate;
   a host integrated circuit (IC) chiplet coupled to the package substrate and comprising:
   at least one processing element;
   a first die-to-die (D2D) interface of a first type to transfer memory information from the at least one processing element via a communications fabric;
   a memory chiplet comprising:
   a second D2D interface of the first type coupled to the first D2D interface via multiple lanes, the second D2D interface organized into multiple unit interface modules, each of the multiple unit interface modules corresponding to a first set of signal path resources of a lowest granularity provided by the multiple lanes;
   a memory port comprising a memory physical interface of a first memory type to access memory storage of the first memory type, the memory physical interface of the first memory type comprising a second set of signal path resources corresponding to multiple memory channels of a first memory type; and
   mapping circuitry to map the second set of signal path resources to the first set of signal path resources in a manner that utilizes all of the first set of signal path resources for an integer number of the multiple unit interface modules.

2. The chiplet-based MCM of claim 1, wherein:
   each module corresponds to signal path resources for more than one memory channel of the first memory type.

3. The chiplet-based MCM of claim 1, wherein:
the first set of signal path resources comprises unidirectional data paths; and
the second set of signal path resources comprises bidirectional data paths.

4. The chiplet-based MCM of claim 3, wherein:
the first D2D interface of the first type comprises a Universal Chiplet Interface Express (UCIe) interface; and
the memory physical interface of the first memory type comprises a High-Bandwidth Memory (HBM) physical interface.

5. The chiplet-based MCM of claim 1, wherein:
the first set of signal path resources comprises bidirectional data paths; and
the second set of signal path resources comprises bidirectional data paths.

6. The chiplet-based MCM of claim 5, wherein:
the first D2D interface of the first type comprises a Universal Memory Interface (UMI) interface; and
the memory physical interface of the first memory type comprises a High-Bandwidth Memory (HBM) physical interface.

7. The chiplet-based MCM of claim 1, wherein the mapping circuitry further comprises:
a selectable first mapping circuit for a first mode of operation; and
a selectable second mapping circuit for a second mode of operation.

8. The chiplet-based MCM of claim 1, wherein:
the first memory type comprises High-Bandwidth Memory (HBM).

9. The chiplet-based MCM of claim 1, wherein:
the second D2D interface, the memory port and the mapping circuitry of the memory chiplet are formed in a base die; and
the memory storage comprises at least one memory die of the first memory type stacked on the base die.

10. The chiplet-based MCM of claim 1, wherein the memory chiplet further comprises:
a memory controller of the first memory type.

11. A memory chiplet, comprising:
a D2D interface of a first type to couple to a host IC chip via multiple lanes, the D2D interface of the first type comprising multiple unit interface modules, each of the multiple unit interface modules corresponding to a first set of signal path resources of a lowest granularity provided by the multiple lanes;
a memory port comprising a memory physical interface of a first memory type to access memory storage of the first memory type, the memory physical interface of the first memory type comprising a second set of signal path resources corresponding to multiple memory channels of the first memory type; and
mapping circuitry to map the second set of signal path resources to the first set of signal path resources for an integer number of the multiple unit interface modules.

12. The memory chiplet of claim 11, wherein:
each module corresponds to signal path resources for more than one memory channel of the first memory type.

13. The memory chiplet of claim 11, wherein:
the first set of signal path resources comprises unidirectional data paths; and
the second set of signal path resources comprises bidirectional data paths.

14. The memory chiplet of claim 13, wherein:
the D2D interface of the first type comprises a Universal Chiplet Interface Express (UCIe) interface; and
the memory physical interface of the first memory type comprises a High-Bandwidth Memory (HBM) physical interface.

15. The memory chiplet of claim 11, wherein:
the first set of signal path resources comprises bidirectional data paths; and
the second set of signal path resources comprises bidirectional data paths.

16. The memory chiplet of claim 15, wherein:
the D2D interface of the first type comprises a Universal Memory Interface (UMI) interface; and
the memory physical interface of the first memory type comprises a High-Bandwidth Memory (HBM) physical interface.

17. The memory chiplet of claim 11, wherein the mapping circuitry further comprises:
a selectable first mapping circuit for a first mode of operation; and
a selectable second mapping circuit for a second mode of operation.

18. The memory chiplet of claim 11, wherein:
the first memory type comprises High-Bandwidth Memory (HBM).

19. The memory chiplet of claim 11, wherein:
the D2D interface of the first type, the memory port and the mapping circuitry of the memory chiplet are formed in a base die; and
the memory storage comprises at least one memory die of the first memory type stacked on the base die.

20. The memory chiplet of claim 11, wherein the memory chiplet further comprises:
a memory controller of the first memory type.

* * * * *